United States Patent
Yanakiev

(10) Patent No.: US 7,735,320 B2
(45) Date of Patent: Jun. 15, 2010

(54) DUAL STAGE TURBOCHARGER CONTROL SYSTEM

(75) Inventor: Ognyan N. Yanakiev, Canton, MI (US)

(73) Assignee: GM Global Technology Operations, Inc., Detroit, MI (US)

(*) Notice: Subject to any disclaimer, the term of this patent is extended or adjusted under 35 U.S.C. 154(b) by 140 days.

(21) Appl. No.: 11/468,035

(22) Filed: Aug. 29, 2006

(65) Prior Publication Data
US 2008/0053088 A1  Mar. 6, 2008

(51) Int. Cl.
F02D 23/00 (2006.01)
(52) U.S. Cl. .......................... 60/602; 60/612
(58) Field of Classification Search ........... 60/602, 60/612
See application file for complete search history.

(56) References Cited

U.S. PATENT DOCUMENTS

| | | | | |
|---|---|---|---|---|
| 4,804,316 | A * | 2/1989 | Fleury | 417/407 |
| 5,063,744 | A * | 11/1991 | Ishiyama et al. | 60/612 |
| 5,186,005 | A * | 2/1993 | Yoshioka et al. | 60/612 |
| 6,311,493 | B1 * | 11/2001 | Kurihara et al. | 60/602 |
| 6,378,308 | B1 * | 4/2002 | Pfluger | 60/612 |
| 6,418,719 | B2 * | 7/2002 | Terry et al. | 60/602 |
| 6,801,846 | B1 * | 10/2004 | Rodriguez et al. | 60/612 |
| 7,000,393 | B1 * | 2/2006 | Wood et al. | 60/612 |
| 7,360,362 | B2 * | 4/2008 | Nicolle et al. | 60/612 |
| 2002/0112478 | A1 * | 8/2002 | Pfluger | 60/612 |
| 2006/0059910 | A1 * | 3/2006 | Spaeder et al. | 60/612 |
| 2006/0070381 | A1 * | 4/2006 | Parlow et al. | 60/612 |
| 2006/0123782 | A1 * | 6/2006 | Rosin et al. | 60/612 |
| 2006/0174621 | A1 * | 8/2006 | Chen et al. | 60/612 |
| 2007/0068158 | A1 * | 3/2007 | Sun et al. | 60/605.2 |
| 2007/0107430 | A1 * | 5/2007 | Schmid et al. | 60/612 |
| 2007/0151243 | A1 * | 7/2007 | Stewart | 60/612 |
| 2007/0295007 | A1 * | 12/2007 | McNulty et al. | 60/602 |
| 2008/0148727 | A1 * | 6/2008 | de Ojeda | 60/602 |
| 2008/0173016 | A1 * | 7/2008 | Barthelet | 60/602 |
| 2009/0060719 | A1 * | 3/2009 | Haugen | 60/602 |

FOREIGN PATENT DOCUMENTS

| | | |
|---|---|---|
| DE | 3506303 | 10/1985 |
| DE | 3941715 | 6/1991 |
| DE | 10126596 | 12/2001 |
| DE | 10352712 | 6/2005 |
| EP | 1275832 A2 * | 1/2003 |
| EP | 1519017 A1 * | 3/2005 |
| JP | 2005315163 A * | 11/2005 |
| WO | WO 2006106058 A1 * | 10/2006 |
| WO | WO 2007083131 A1 * | 7/2007 |

* cited by examiner

Primary Examiner—Thomas E. Denion
Assistant Examiner—Mary A Davis

(57) ABSTRACT

A control system for a dual stage turbo includes a control module, a variable geometry turbine (VGT) module, and a bypass valve module. The control module generates a turbo control signal based on an manifold absolute pressure (MAP) and a desired MAP. The VGT module generates a VGT control signal to actuate vanes in a VGT based on the turbo control signal. The bypass valve module generates a bypass control signal based on the turbo control signal and the VGT control signal. The bypass control signal actuates a valve to bypass the VGT.

8 Claims, 3 Drawing Sheets

DUAL STAGE TURBOCHARGER CONTROL SYSTEM

FIELD OF THE INVENTION

The present invention relates to dual stage turbochargers, and more particularly to coordinating control of a variable geometry turbine and a bypass valve associated with dual stage turbochargers.

BACKGROUND OF THE INVENTION

Internal combustion engines combust an air and fuel mixture within cylinders of the engine to produce drive torque. Engines can include a turbocharger that increases torque output by delivering additional air into the cylinders. Some turbochargers are dual stage turbochargers. Dual stage turbochargers have a high pressure stage and a low pressure stage arranged in series. When the engine is operating at low speeds, exhaust flows through the high pressure stage and then through the low pressure stage. By allowing exhaust to flow through the high pressure stage and then the low pressure stage turbo lag may be reduced. As engine speed increases a bypass valve (BPV) may open bypassing the flow of exhaust through the high pressure stage and allowing the exhaust to flow through the low pressure stage.

Some dual stage turbochargers may use a variable geometry turbine (VGT) in the high pressure stage to further reduce turbo lag. The VGT typically has a set of movable vanes to control pressure of the exhaust flowing through the high pressure stage. At low engine speeds when exhaust flow is low, the vanes are partially closed to accelerate the VGT. Accelerating the VGT increases boost pressure delivered to a compressor in the high pressure stage. As engine speed increases, the vanes are opened to slow down the VGT. Slowing down the VGT prevents the boost pressure from reaching excessive levels.

The BPV and the VGT are typically controlled separately. A lookup table indexed by engine speed and torque is typically used to control the position of the BPV. The VGT is typically controlled with a feedback control system. As a result, the BPV may open before the VGT has fully opened, which is undesirable

SUMMARY OF THE INVENTION

A control system for a dual stage turbo includes a control module, a variable geometry turbine (VGT) module, and a bypass valve module. The control module generates a turbo control signal based on an manifold absolute pressure (MAP) and a desired MAP. The VGT module generates a VGT control signal to actuate vanes in a VGT based on the turbo control signal. The bypass valve module generates a bypass control signal based on the turbo control signal and the VGT control signal. The bypass control signal actuates a valve to bypass the VGT.

In other features, the bypass control signal actuates the valve toward a first position when the vanes are in a predetermined position. The bypass control signal actuates the valve toward a second position when the vanes are not in the predetermined position. The valve bypasses the VGT when in the first position and the valve does not bypass the VGT when in the second position.

In other features, the first position is an open position. The second position is a closed position.

In other features, the VGT control signal is based on the predetermined position and the turbo control signal. The bypass control signal is based on the second position and a difference between the turbo control signal and the predetermined position.

In other features, the VGT control signal is based on a lowest value between the predetermined position and the turbo control signal. The bypass control signal is based on a highest value between the second position and the difference.

In still other features, the MAP is based on at least one of an intake manifold pressure and a exhaust manifold pressure.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
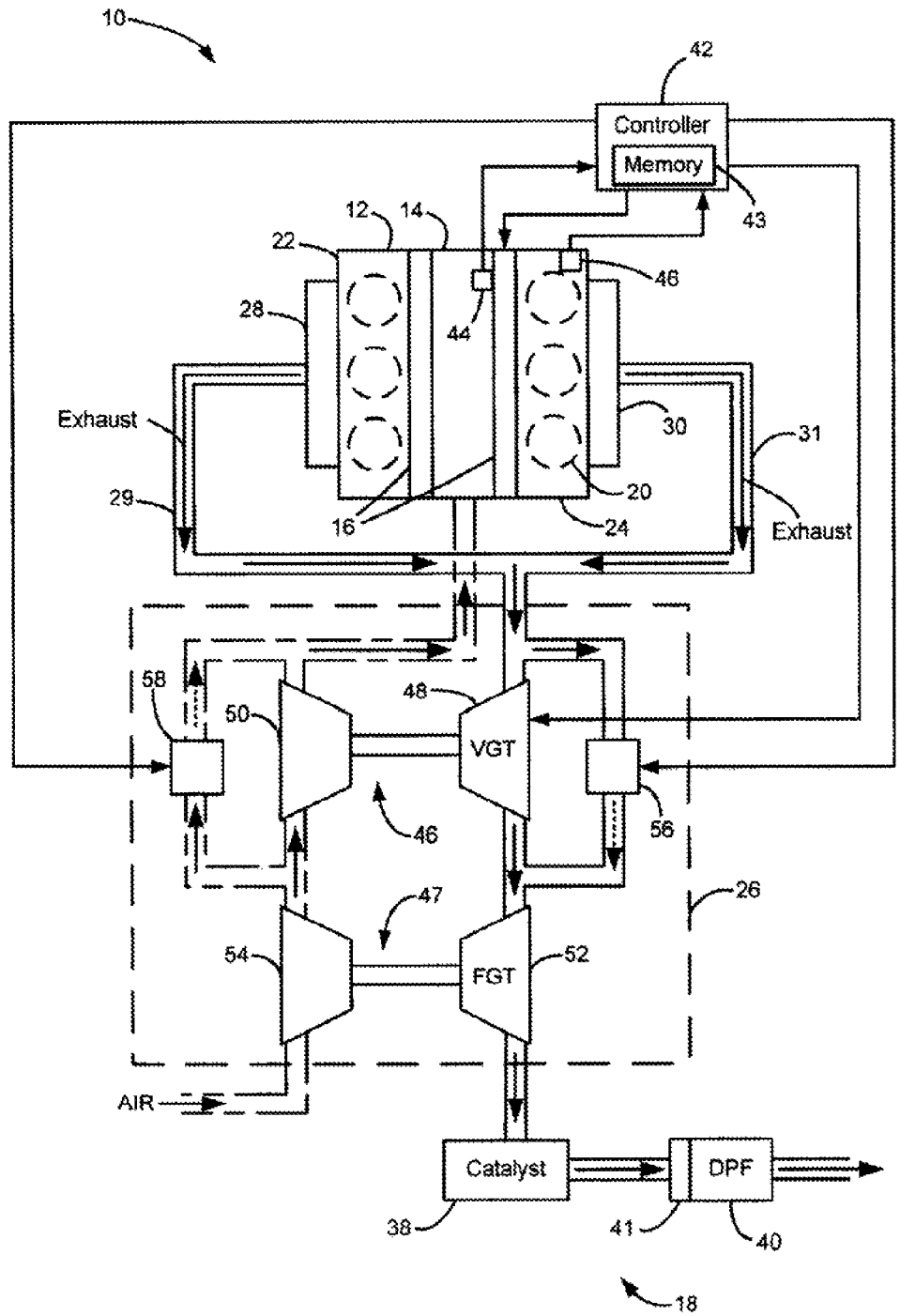
FIG. 1 is a functional block diagram of an exemplary engine system with a dual stage turbocharger.

The following description of the preferred embodiment(s) is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

Referring now to FIG. 1 an exemplary engine system 10 is illustrated. The engine system 10 includes a diesel engine 12, an intake manifold 14, a common rail fuel injection system 16, and an exhaust system 18. The exemplary engine 12 includes six cylinders 20 configured in adjacent cylinder banks 22,24 in V-type layout. Although FIG. 1 depicts six cylinders (N=6), it can be appreciated that the engine 12 may include additional or fewer cylinders 20. For example, engines having 2, 4, 5, 8, 10, 12 and 16 cylinders are contemplated.

Air is drawn into the cylinders 20 from the intake manifold 14 and is compressed therein. Fuel is injected into the cylinders 20 by the common rail injection system 16 and the heat of the compressed air ignites the air/fuel mixture. The exhaust gases are exhausted from the cylinders 20 into the exhaust system 18. In some instances, the engine system 10 can include a dual stage turbo 26 that pumps additional air into the cylinders 20 for combustion.

The exhaust system 18 includes exhaust manifolds 28,30, exhaust conduits 29,31 a catalyst 38, and a diesel particulate filter (DPF) 40. First and second exhaust segments are defined by the first and second cylinder banks 22,24. The exhaust manifolds 28,30 direct the exhaust segments from the corresponding cylinder banks 22,24 into the exhaust conduits 29,31, wherein the exhaust is directed to drive the dual stage turbo 26. The exhaust flows from the dual stage turbo 26 through the catalyst 38 and the DPF 40. The DPF 40 filters particulates from the exhaust as it flows to the atmosphere.

A controller 42 that has memory 43 regulates operation of the diesel engine system 10 including controlling the dual stage turbo 26. More particularly, the controller 42 communicates with an intake manifold absolute pressure (MAP) sensor 44 and an engine speed sensor 46. The MAP sensor 44 generates a MAP signal indicating the air pressure within the intake manifold 14. The engine speed sensor 46 generates a RPM signal indicating engine speed. The controller 42 may control operation of the dual stage turbo 26 based on the MAP signal. Although the controller 42 controls operation of the dual stage turbo 26 based on intake manifold pressure in this example, skilled artisans will recognize that exhaust manifold pressure or a combination (such as a ratio or difference) of intake and exhaust manifold pressure may be used to control the dual stage turbo 26.

The dual stage turbo 26 may include a high pressure turbo 48 and a low pressure turbo 47. The high pressure turbo 48 may include a variable geometry turbine (VGT) 48 and a high pressure compressor 50. When exhaust flows through the VGT 48 the high pressure compressor 50 spins and compresses air in the cylinders 20. The VGT 48 typically has a set of movable vanes (not shown) to control pressure of the exhaust flowing through the high pressure turbo 48. At low engine speeds when exhaust flow is low, the vanes are partially closed increasing the speed of the high pressure turbo 48. As engine speed increases, the vanes are opened to reduce the speed of the high pressure turbo 48.

The low pressure turbo 47 may include a fixed geometry turbine (FGT) 52 and a low pressure compressor 54. Exhaust flow through the FGT 52 causes the low pressure compressor 54 to spin and compress air. When the engine 12 is operating at low speeds exhaust flows from the exhaust manifolds 28, 30 into the VGT 48 and then through the FGT 52. By allowing exhaust to flow through the high pressure turbo 46 and then the low pressure turbo 47, turbo lag may be reduced. As engine speed increases, a turbine bypass valve (BPV) 56 may open bypassing the flow of exhaust through the VGT 48 and allowing the exhaust to flow through the FGT 52. A compressor bypass valve 58 may operate in conjunction with the turbine BPV 56. However, in some embodiments the compressor bypass valve 58 and the turbine BPV 56 may operate independently. The compressor bypass valve 58 prevents the high pressure compressor 50 from spinning faster than a predetermined speed.

Figure 2:
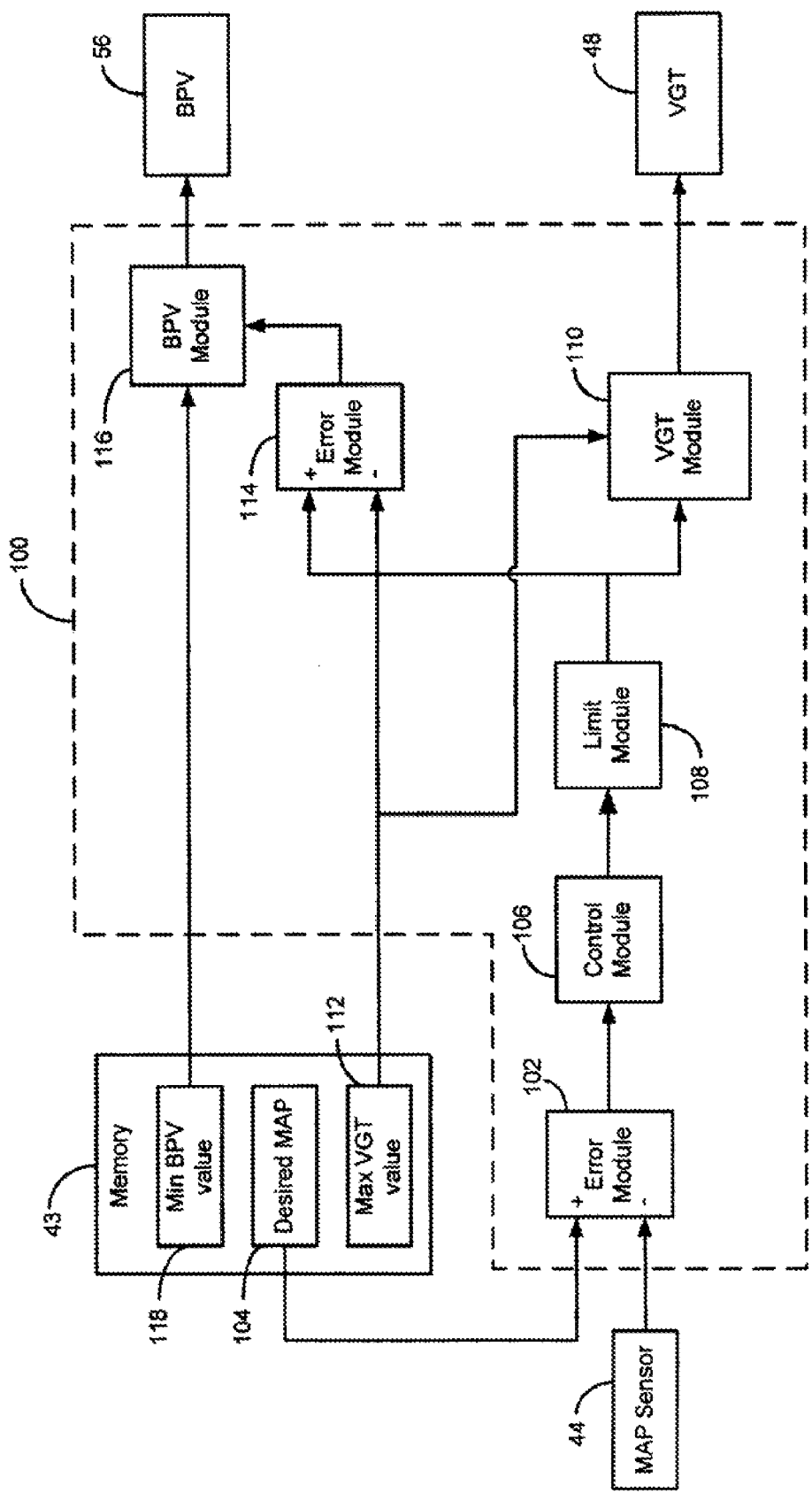
FIG. 2 is a functional block diagram of a dual stage turbo control system according to the present invention.

Referring now to FIG. 2, a dual stage turbo control system 100 coordinates control of the VGT 48 and the turbine BPV 56. More specifically, the dual stage turbo control system 100 controls the VGT 48 and the turbine BPV 56 in a manner to ensure that the vanes of the VGT 48 are in a predetermined position, such as a completely open position, before the turbine BPV 56 begins to open.

A first error module 102 compares the MAP signal generated by the MAP sensor 44 to a desired MAP 104. The desired MAP 104 is stored in memory 43 and may be configured to obtain an optimal performance characteristic of the engine system 10. The first error module 102 generates a first error signal that represents the difference between the MAP signal and the desired MAP 104. A control module 106 receives the first error signal and generates a control signal based thereon. The control module 106 may be any type of single input single output (SISO) controller. Exemplary SISO include, but are not limited to, a transfer function, a proportional integral derivative (PID) controller or any variation thereof (e.g., a PI controller), and a lookup table.

A limit module 108 receives the control signal and generates a scaled control signal. To generate the scaled control signal, the limit module 108 scales the control signal to a range that is capable of being interpreted from the VGT 48 and the turbine BPV 56. For example, if 0 represents closed and 1 represents open, the limiting module would scale the control signal to a value between 0 and 1.

A VGT module 110 compares the scaled control signal to a maximum VGT value 112 that is stored in memory 43 and generates a VGT control signal to control the VGT 48. The maximum VGT value 112 represents a value that corresponds to a fully open VGT 48. However, in some embodiments the maximum VGT value may be a predetermined position that maximizes efficiency of the dual stage turbo 26. The VGT control signal corresponds to a lowest value between the scaled control signal and the maximum VGT value 112. The VGT control signal may be determined with the following equation:

$$U_{VGT} = \min(u, U_{MaxVGT})$$

where $U_{VGT}$ is the VGT control valve signal, u is the scaled control signal, and $U_{MaxVGT}$ is the maximum VGT value 112.

A second error module 114 compares the scaled control signal to the maximum VGT value 112 and generates a second error signal. The second error signal represents a difference between the scaled control signal and the maximum VGT value 112.

A BPV module 116 compares the scaled control signal to a minimum BPV value 118 that is stored in memory 43 and generates a bypass control signal to control the BPV 56. The minimum BPV value 118 represents a value that corresponds to a fully closed BPV 56. The bypass control signal corresponds to a maximum value between the second error signal and the minimum BPV value 118. The bypass control signal may be determined with the following equation:

$$U_{BPV} = \max(U_{MinBPV}, u - U_{MaxVGT})$$

where $U_{BPV}$ is the bypass control signal, u is the scaled control signal, and $U_{MaxVGT}$ is the maximum VGT value 112.

Figure 3:
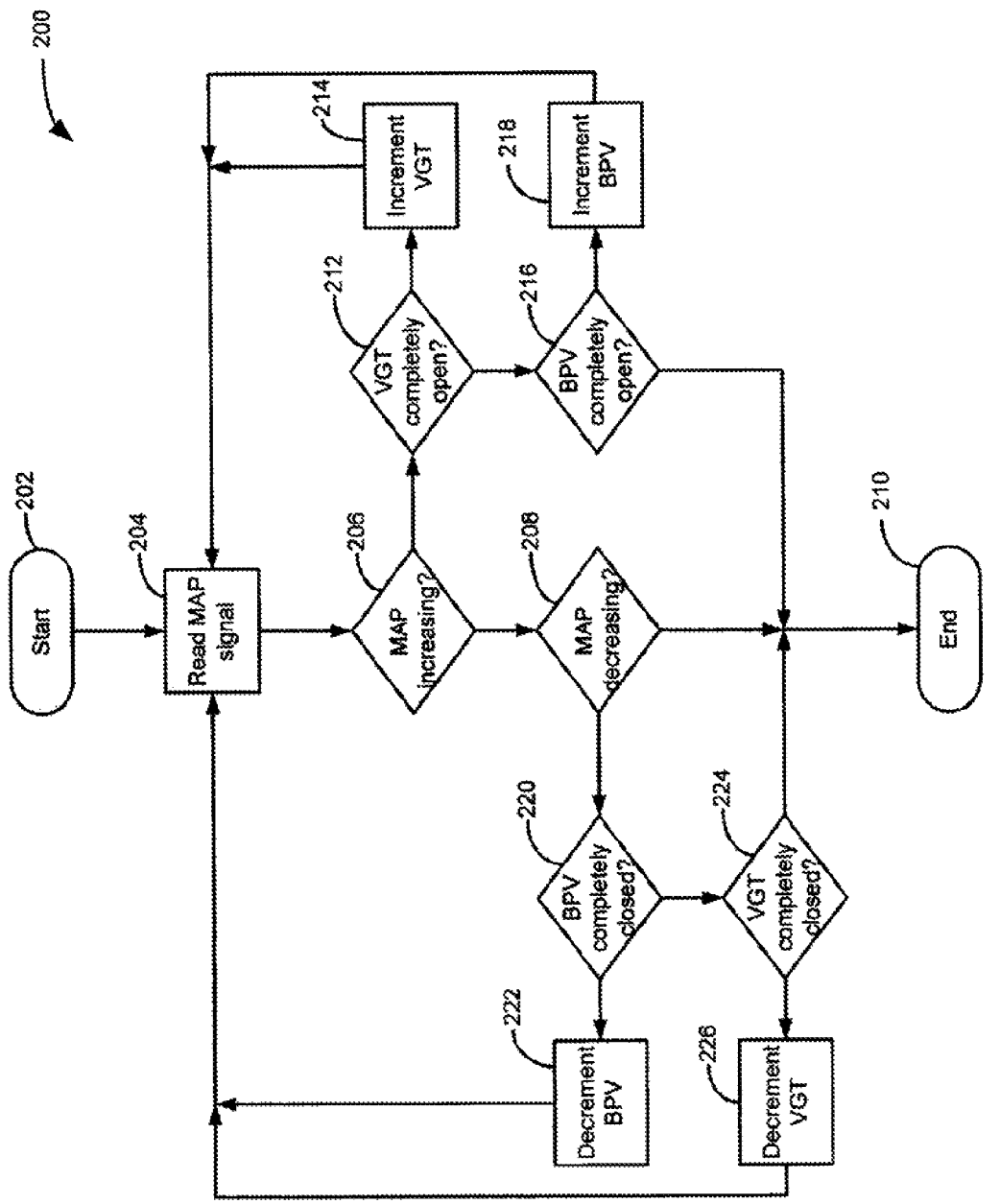
FIG. 3 is a flow chart illustrating exemplary steps taken by the dual stage turbo control system.

Referring now to FIG. 3, the dual stage turbo control system 100 may implement steps generally identified at 200. The process starts in step 200 when the engine system 10 is started. In step 204, control reads the MAP signal generated by the MAP sensor 44. In step 206, control determines whether the MAP signal is increasing with respect to a predetermined value. If the MAP signal is not increasing, control determines whether the MAP signal is decreasing in step 208. If the MAP signal is not decreasing, control ends in step 210.

If control determines that the MAP signal is increasing in step 206, control determines whether the VGT 48 in completely open in step 212. If the VGT 48 is not completely open, control incrementally opens the VGT 48 in step 214 and the process returns to step 204. If the VGT 48 is completely open, control determines whether the BPV 56 is completely open in step 216. If the BPV 56 is completely open, control ends in step 210. If the BPV 56 is not completely open, control incrementally opens the BPV 56 in step 218 and the process returns to step 204.

If control determines that the MAP signal is decreasing in step 208, control determines whether the BPV 56 is completely closed in step 220. If the BPV 56 is not completely closed, control decrements the BPV 56 in step 222 and the process returns to step 204. If the BPV 56 is completely closed, control determines whether the VGT 48 is completely closed in step 224. If the VGT is not completely closed, control decrements the VGT 48 in step 226 and the process returns to step 204. If the VGT 48 is completely closed, control ends in step 210.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and the following claims.

What is claimed is:

1. A control system for a dual stage turbo having a variable geometry turbine (VGT) and a fixed geometry turbine (FGT), comprising:
   a control module that generates a turbo control signal based on intake manifold pressure and a desired value of said intake manifold pressure;
   a variable geometry turbine (VGT) module that generates a VGT control signal to actuate vanes in the VGT based on said turbo control signal, wherein said VGT control signal actuates said vanes between a first vane position and a second vane position as the intake manifold pressure increases, and wherein said second vane position is a fully opened vane position; and
   a bypass valve module that generates a bypass control signal based on said VGT control signal; when said vanes are at said second vane position and the intake manifold pressure is increasing, said bypass control signal actuates a valve toward an open position to bypass said VGT and directs exhaust gasses to the FGT.

2. The control system of claim 1 wherein said bypass control signal actuates said valve toward a closed valve position when said vanes are not in said second vane position.

3. The control system of claim 1 wherein said vanes actuate from said first vane position to said second vane position as said VGT control signal changes from a first value to a second value, when said vanes are at said second vane position, said valve is opened when said intake manifold pressure is increasing.

4. The control system of claim 3 wherein said valve incrementally continues to open as said VGT control signal is at said second value and the intake manifold pressure is increasing.

5. A method of controlling a dual stage turbo having a variable geometry turbine (VGT) and a fixed geometry turbine (FGT), comprising:
   generating a turbo control signal based on an intake manifold pressure and a desired value of said intake manifold pressure;
   when the intake manifold pressure is increasing, generating a variable geometry turbine (VGT) control signal to actuate vanes in the VGT based on said turbo control signal, wherein said VGT control signal actuates said vanes between a first vane position and a second vane position, and wherein said second vane position is a fully opened vane position; and
   generating a bypass control signal based on said VGT control signal; when said vanes are at said second vane position and the intake manifold pressure is increasing, said bypass control signal actuates a valve to bypass said VGT and directs exhaust gasses to the FGT.

6. The method of claim 5 further comprising actuating said valve toward a closed valve position when said vanes are not in said predetermined vane position.

7. The method of claim 5 wherein said vanes actuate from said first vane position to said second vane position as said VGT control signal changes from a first value to a second value, when said vanes are at said second vane position, said valve is opened when said intake manifold pressure is increasing.

8. The method of claim 7 wherein said valve incrementally continues to open as said VGT control signal is at said second value and the intake manifold pressure is increasing.

* * * * *